United States Patent
Ike et al.

(10) Patent No.: US 7,765,865 B2
(45) Date of Patent: Aug. 3, 2010

(54) FLOW SENSOR UNIT INCLUDING AN INSULATING MEMBER INTERPOSED BETWEEN THE SENSOR CHIP AND THE ATTACHMENT PLATE

(75) Inventors: Shinichi Ike, Tokyo (JP); Shoji Kamiunten, Tokyo (JP); Junji Kumasa, Tokyo (JP)

(73) Assignee: Yamatake Corporation (JP)

( * ) Notice: Subject to any disclaimer, the term of this patent is extended or adjusted under 35 U.S.C. 154(b) by 0 days.

(21) Appl. No.: 12/191,924

(22) Filed: Aug. 14, 2008

(65) Prior Publication Data

US 2009/0078041 A1    Mar. 26, 2009

(30) Foreign Application Priority Data

Sep. 20, 2007  (JP) .............................. 2007-244543

(51) Int. Cl.
*G01F 1/68* (2006.01)
(52) U.S. Cl. .................. 73/204.22; 73/204.26
(58) Field of Classification Search ............... 73/204.26
See application file for complete search history.

(56) References Cited

U.S. PATENT DOCUMENTS

| | | | | |
|---|---|---|---|---|
| 4,559,814 A | * | 12/1985 | Sato et al. ................. | 73/114.34 |
| 5,891,751 A | * | 4/1999 | Kurtz et al. ................ | 438/53 |
| 6,444,598 B1 | * | 9/2002 | Kawakami et al. ......... | 501/32 |
| 6,591,674 B2 | * | 7/2003 | Gehman et al. ........... | 73/204.22 |
| 6,845,664 B1 | * | 1/2005 | Okojie ..................... | 73/431 |
| 6,892,578 B2 | * | 5/2005 | Saitoh et al. ............. | 73/514.33 |
| 7,032,446 B2 | * | 4/2006 | Nakada et al. ............ | 73/202.5 |
| 7,152,478 B2 | * | 12/2006 | Peterson et al. ........... | 73/715 |
| 7,383,726 B2 | * | 6/2008 | Ike et al. .................. | 73/204.22 |
| 7,530,267 B2 | * | 5/2009 | Uramachi .................. | 73/202.5 |
| 2003/0110854 A1 | * | 6/2003 | Nakada et al. ............ | 73/204.22 |
| 2004/0040382 A1 | * | 3/2004 | Peterson et al. ........... | 73/708 |
| 2004/0178879 A1 | * | 9/2004 | Mitra et al. ............... | 338/34 |

FOREIGN PATENT DOCUMENTS

| | | |
|---|---|---|
| JP | 2002-168669 | 6/2002 |
| JP | 2004-325335 | 11/2004 |

* cited by examiner

*Primary Examiner*—Harshad Patel
(74) *Attorney, Agent, or Firm*—Cantor Colburn LLP

(57) ABSTRACT

A flow sensor may be formed of a sensor chip in which a flow rate detecting section is formed on an electric insulating film applied to cover at least a part of a concave portion formed on an upper surface of a substrate and may also include a flow path forming member which is provided on the sensor chip and has a flow path of a fluid flowing through the flow rate detecting section formed therein.

5 Claims, 7 Drawing Sheets

FLOW SENSOR UNIT INCLUDING AN INSULATING MEMBER INTERPOSED BETWEEN THE SENSOR CHIP AND THE ATTACHMENT PLATE

BACKGROUND OF THE INVENTION

1. Field of the Invention

The present invention relates to a flow sensor unit that is used in a place requiring pressure resistance in particular in a gas line of, e.g., a semiconductor manufacturing apparatus.

2. Description of the Related Art

For example, as a flow sensor (a flow measuring apparatus) that detects a flow rate of a measurement target fluid, e.g., a gas used in a semiconductor manufacturing apparatus, a thermal flow sensor that measures a temperature difference of a fluid at a predetermined position by giving heat to the fluid to measure a small flow rate is known (see, e.g., Japanese Patent Application Laid-open No. 2002-168669 (pp. 5-6, FIG. 1) and Japanese Patent Application Laid-open No. 2004-325335 (pp. 6-7, FIG. 8)).

SUMMARY OF THE INVENTION

It is an object of the present invention to provide a flow sensor unit that can uniform and stabilize a temperature of a sensor chip and can assure a sufficient breakdown voltage.

To achieve this object, a flow sensor unit according to the present invention comprises:

a flow sensor having: a sensor chip in which a flow rate detecting section is formed on an electric insulating film applied to cover at least a part of a concave portion formed on an upper surface of a substrate; and a flow path forming member which is provided on the sensor chip and has a flow path of the fluid flowing through the flow rate detecting section formed therein;

a metal flow path body which accommodates the flow sensor and has an accommodating portion accommodating the flow sensor in a state where an inner peripheral surface of the flow path body is separated from an outer peripheral portion of the flow sensor formed therein;

a metal attachment plate which is fixed to the flow path body so as to accommodate the flow sensor in a state where the flow sensor is fixed and held in the accommodating portion of the flow path body; and an insulating member which is interposed between the sensor chip of the flow sensor and the attachment plate, bonded to the sensor chip, and also bonded to the attachment plate.

The insulating member is interposed between the sensor chip of the flow sensor and the metal attachment plate, and this insulating member is bonded to the sensor chip and also bonded to the attachment plate, thereby fixing the flow sensor to the attachment plate. Moreover, the flow sensor is accommodated in the accommodating portion formed in this flow path body in a state where the attachment plate is disposed to the metal flow path body.

As a result, the sensor chip is hardly affected by heat transmitted through the metal attachment plate, and a temperature of the sensor chip can be uniformed and stabilized to avoid degradation in a detection accuracy of the flow sensor. Additionally, a parasitic capacitance between the sensor chip and the attachment plate is reduced, and the sensor chip is hardly affected by noise and others, thus avoiding degradation in output characteristics of the flow sensor. Further, reducing the parasitic capacitance between the sensor chip and the metal attachment plate enables preventing a voltage exceeding a breakdown voltage of the sensor chip from being applied to the sensor chip.

Preferably, in the flow sensor unit according to the present invention, it is good to provide a structure where the sensor chip is formed of a silicon member, the body and the attachment plate are formed of a stainless member, and the insulating member is formed of borosilicate glass.

The insulating member formed of a borosilicate glass material having high thermal insulation and electrical insulation is interposed between the sensor chip formed of a silicon material and the attachment plate formed of a stainless material, and this insulating member is bonded to the sensor chip and also bonded to the attachment plate to insulate the sensor chip from the attachment plate. When the borosilicate glass having a thermal expansion coefficient close to that of silicon is used as a material of the insulating member, a distortion due to, e.g., a change in a temperature around the sensor chip and the insulating member or a pressure of a measurement target fluid is hardly produced between the sensor chip and the insulating member, and an output from the flow sensor consequently hardly drifts, thus avoiding degradation in a detection accuracy of the flow sensor.

Further, preferably, in the flow sensor unit according to the present invention, it is good to provide a structure where a concave portion is formed at a central position of an upper surface of the flow sensor chip below the flow rate detecting section, a region of the electric insulating film that covers the concave portion where the flow rate detecting section is formed serves as a diaphragm to thermally insulate the flow rate detecting section from the sensor chip therearound, and the flow rate detecting section serves as a thermal flow rate detecting section and is constituted of a heater as a heat generating element and temperature measuring elements as resistance elements arranged on an upstream side and a downstream side of the heater at equal intervals on the electric insulating film.

When the flow sensor unit according to the present invention has such a structure, the flow rate detecting section is hardly affected by heat from the sensor chip therearound, thereby providing the flow sensor unit that can further accurately detect a flow rate of a measurement target fluid.

Furthermore, preferably, it is good to provide a structure where a space between an inner peripheral surface of the flow sensor accommodating portion of the flow path body and an outer peripheral portion of the flow sensor is a vacuum, or filled with air, or filled with a member having heat insulation and electrical insulation.

When the flow sensor unit according to the present invention has such a structure, the flow rate detecting section is hardly affected by heat from the flow path body therearound, thereby providing the flow sensor unit that can further accurately detect a flow rate of a measurement target fluid.

DETAILED DESCRIPTION OF THE PREFERRED EMBODIMENTS

A flow sensor unit according to an embodiment of the present invention will now be explained hereinafter with reference to the drawings.

Figure 1:
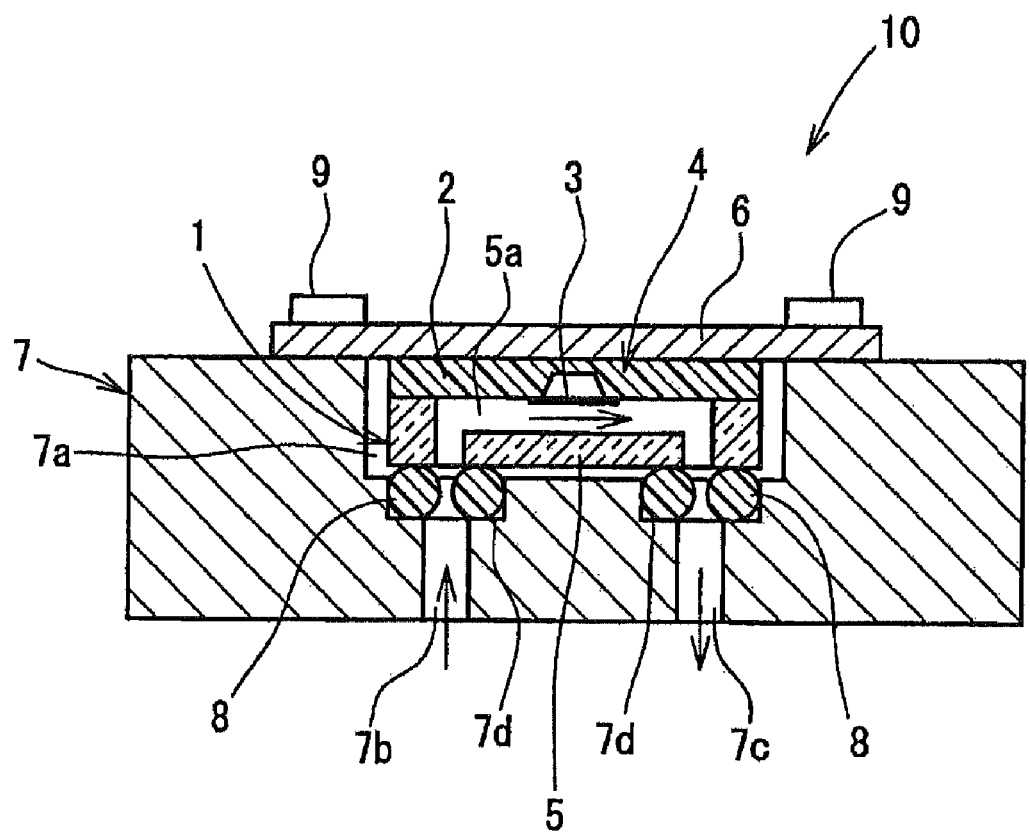
FIG. 1 is a cross-sectional view of a flow sensor unit according to the present invention.

FIG. 1 shows an example of a thermal flow sensor concerning the present invention, and the thermal flow sensor 1 is formed by bonding a sensor chip 4 having a flow rate detecting section 3 formed on a silicon substrate 2 to a flow path forming member (glass) 5 which accommodates the flow rate detecting section (a sensor section) 3 and has a flow path (a groove) 5a for a fluid flowing through the flow rate detecting section 3 formed therein.

When disposing this flow sensor to an apparatus which has a high measurement target fluid pressure and requires pressure resistance, there is proposed a flow sensor unit 10 assembled by bonding and fixing the sensor chip 4 to an attachment plate 6, accommodating the flow sensor 1 in an accommodating portion 7a formed in a metal flow path body 7, e.g., a stainless member, sealing a fluid lead-in path 7b and a fluid lead-out path 7c through O rings 8, and fastening and fixing the attachment plate 6 to the flow path body 7 by using bolts 9.

In this flow sensor unit 10, since a fragile material, e.g., silicon or glass is used as a material of the sensor chip 4, extra consideration must be given to a tolerance concerning a depth of counter borings 7d and flatness of the attachment plate 6 in order to avoid a damage caused due to contact between the flow path body 7 and the flow path forming member 5 when the attachment plate 6 is fastened by using bolts 9 to compress the O rings 8. Therefore, for the attachment plate 6, a metal member such as stainless is often used as a material which is not deformed due to a pressure of a measurement target fluid, can hold the sensor chip 4, and has excellent processability that can satisfy a demand for flatness.

However, in this flow sensor unit 10, since the sensor chip 4 is bonded to the attachment plate 6 through an adhesive, the sensor chip 4 is apt to be affected by external heat transmitted through the attachment plate 6 having a metal with an excellent thermal conductivity as a material thereof. Further, since the sensor chip 4 is formed of the thermal flow rate detecting section 3, a detection accuracy may be degraded in some cases when this sensor chip 4 is affected by heat.

Furthermore, since a parasitic capacitance of approximately 30 to 60 pF is produced between the attachment plate 6 and the sensor chip 4 in this flow sensor unit 10, the sensor chip 4 may come under an electrical influence of, e.g., noise to degrade output characteristics of the flow sensor 1 in some cases.

Moreover, since the sensor chip 4 is bonded to the attachment plate 6 through the adhesive, a thickness of the adhesive as an electric insulating layer between the sensor chip 4 and the attachment plate 6 becomes as thin as approximately 40 μm, and a breakdown voltage of the sensor chip 4 must be increased.

Figure 2:
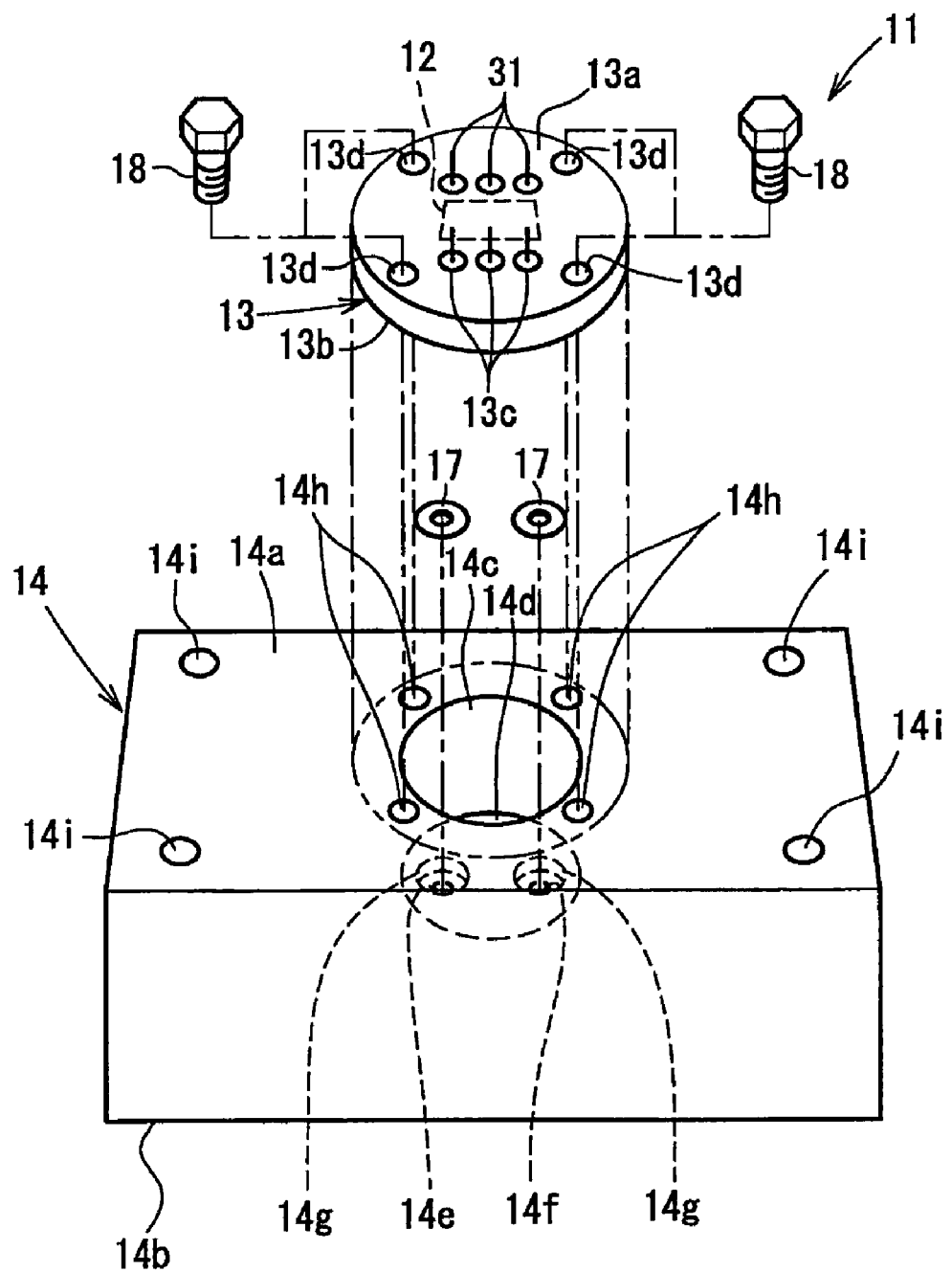
FIG. 2 is an assembling perspective view of the flow sensor unit according to the present invention.

FIG. 2 is an assembling perspective view of a flow sensor unit according to an embodiment of the present invention.

A flow sensor unit 11 is constituted of: a thermal flow sensor 12 which is indicated by a dotted line and detects a flow rate of a measurement target fluid; a metal attachment plate 13 that fixes and holds the flow sensor 12 on a lower surface (an inner surface) thereof; a metal flow path body 14 which has a hole 14c accommodating the flow sensor 12, a fluid lead-in path 14e, and a fluid lead-out path 14f formed therein, houses the flow sensor 12, and fixes the attachment plate 13; and others.

Figure 3:
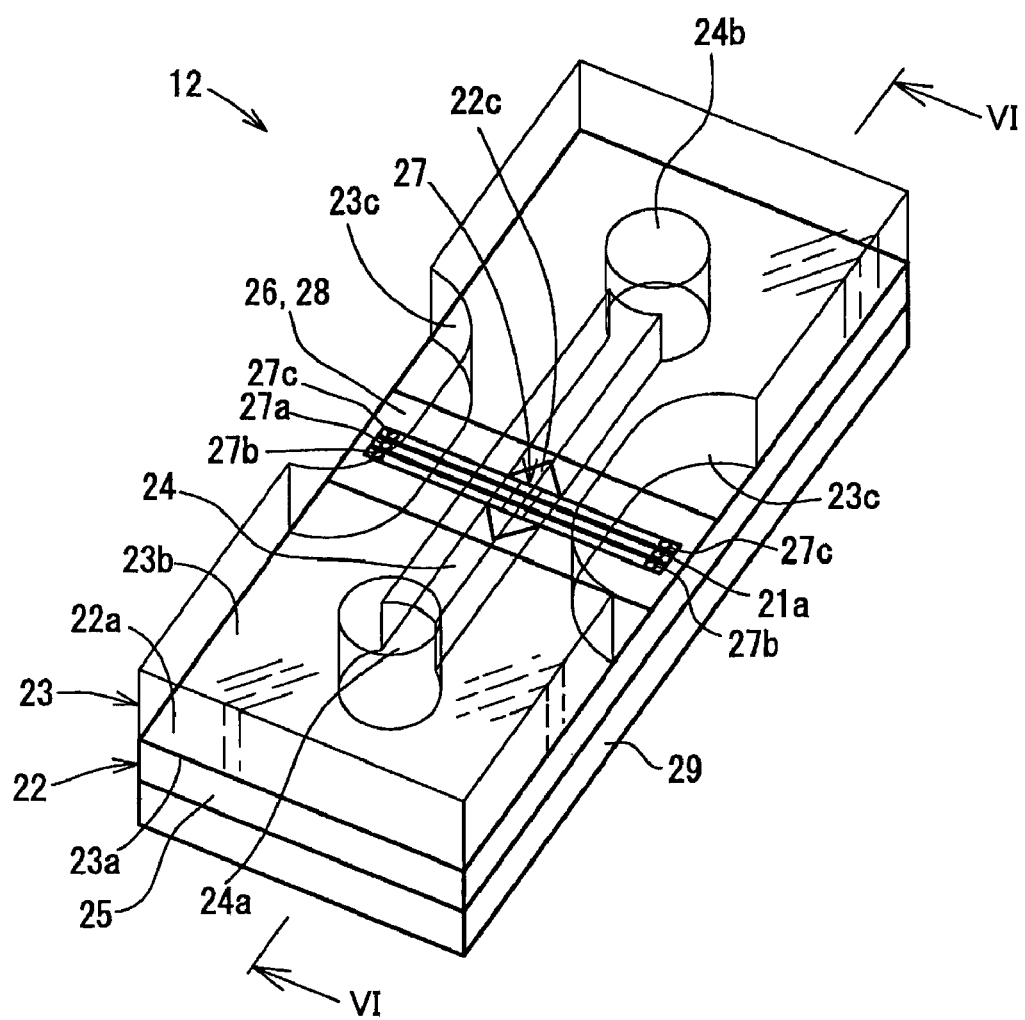
FIG. 3 is a perspective view of a flow sensor used in the flow sensor unit depicted in FIG. 2.

As shown in FIG. 3, the flow sensor 12 is constituted of a flow sensor chip 22 and a transparent glass chip 23 as a flow path forming member which has a lower surface 23a bonded to an upper surface 22a of the flow sensor chip 22 and cooperates with the flow sensor chip 22 to form a small flow path 24 for a measurement target fluid, e.g., a gas. The glass chip 23 is formed of, borosilicate glass, and a fluid lead-in path 24a and a fluid lead-out path 24b opened in an upper surface 23b of the glass chip 23 are formed at both end portions of the flow path 24.

It is to be noted that, as the borosilicate glass, there is, e.g., Pyrex (a registered trademark) glass or Tempax (a registered trademark) glass. In this embodiment, Pyrex (the registered trademark) glass is used for the glass chip 23. However, the Tempax glass may be used in place of this Pyrex (the registered trademark) glass in this embodiment.

In the flow sensor chip 22, a silicon nitride or silicon dioxide electric insulating film (a thin film) 26 is formed on an upper surface of a silicon substrate 25, a flow rate detecting section (a sensor section) 27 is formed at a position in the electric insulating film 26 associated with the central position of the flow path 24, and the flow rate detecting section 27 is covered with a silicon nitride or silicon dioxide electric insulating film 28. It is to be noted that the electric insulating films 26 and 28 are transparently drawn so that the flow path detecting section 27 can be easily seen in FIG. 3.

Figure 4:
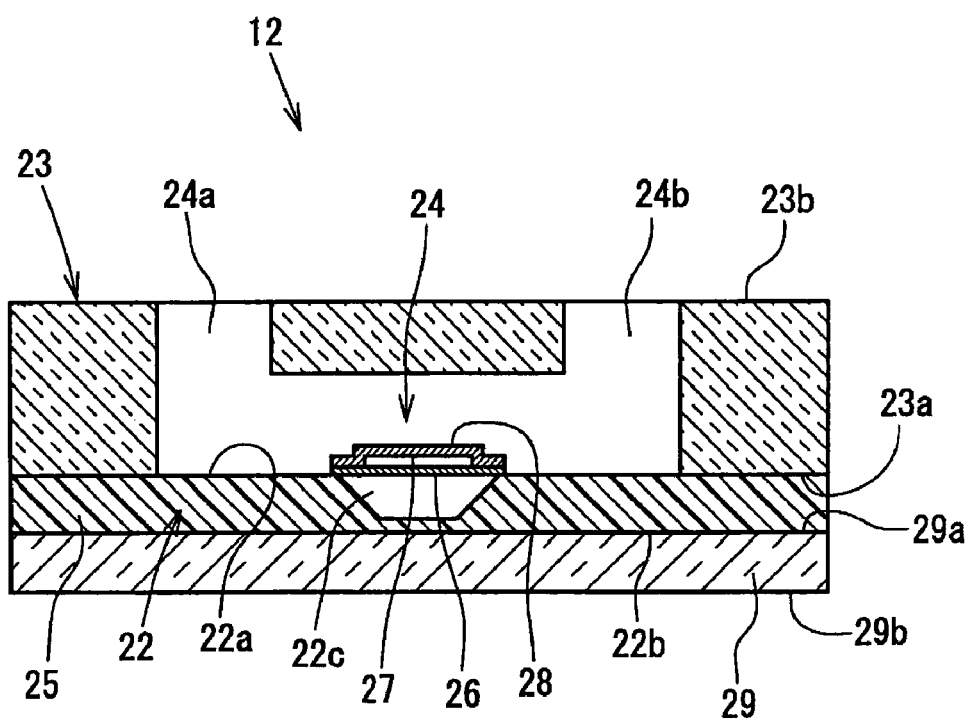
FIG. 4 is a cross-sectional view taken along an arrow line VI-VI of the flow sensor depicted in FIG. 3.

A concave portion 22c is formed at the central position on the upper surface 22a of the flow sensor chip 22 below the flow rate detecting section 27 as shown in FIG. 4, and a region of the electric insulating film 26 where the flow rate detecting section 27 is formed to cover the concave portion 22c is called a diaphragm which thermally insulates the flow rate detecting section 27 from the silicon substrate 25. The flow rate detecting section 27 is constituted of a heater 101 as a heat generating element formed of, e.g., a platinum (Pt) thin film on the electric insulating film 26 in the thermal detecting section and temperature measuring elements 102 and 103 as resistance elements formed of, e.g., platinum thin films arranged on an upstream side and a downstream side of this heater 101 at equal intervals (see FIG. 5).

Lead patterns 27a, 27b, and 27c as signal fetching wiring lines of the heater 101 and the temperature measuring elements 102 and 103 in the flow rate detecting section 27 are extended to both lateral sides (a width direction) of the flow sensor 12 through a space between the upper surface 22a of the flow sensor chip 22 and the lower surface 23a of the glass chip 23. Furthermore, notch portions 23c (see FIG. 3) are formed at the center on both lateral sides of the glass chip 23 along a longitudinal direction so that connection end portions at distal ends of the lead patterns 27a to 27c are exposed to enable achieving connection with an external measurement circuit.

Moreover, the upper surface 22a of the sensor chip 22 and the lower surface 23a of the glass chip 23 are air-tightly bonded to each other based on, e.g., anode junction. It is to be noted that, as bonding of the sensor chip 22 formed of silicon and the glass chip 23 formed of borosilicate glass, a method such as bonding using low-melting glass (e.g., fritted glass) or bonding using an epoxy-based adhesive can be considered in addition to the anode junction. The flow sensor 12 is formed as explained above.

Additionally, an insulating member 29 having high thermal insulation and electrical insulation is bonded to the lower surface 22b of the sensor chip 22 of the flow sensor 12. In this embodiment, although the above-explained Pyrex (the registered trademark) glass of borosilicate glasses is applied as the insulating member 29, Tempax glass may be used in place of this glass. Further, an upper surface 29a of the insulating member 29 is bonded to the lower surface 22b of the sensor chip 22 based on anode junction. It is to be noted that, as bonding of the sensor chip 22 formed of silicon and the insulating member 29 formed of Pyrex (the registered trademark) glass, a bonding method using, e.g., low-melting glass such as fritted glass or an epoxy-based adhesive can be applied in addition to anode junction.

Here, Pyrex (the registered trademark) glass has a thermal conductivity of approximately 1 W/m·k, a relative dielectric constant of 4.6 to 4.8, a dielectric breakdown voltage of 30 kV when a thickness is 1 mm, and a thermal expansion coefficient of $3.2 \times 10^{-6}/°$ C.; and silicon has a thermal conductivity of approximately 150 W/m·k, and a thermal expansion coefficient of $2.3 \times 10^{-6}/°$ C.; and stainless steel has a thermal conductivity of approximately 16.5 W/m·k and a thermal expansion coefficient of $17.5 \times 10^{-6}/°$ C.

Therefore, when a substrate of the sensor chip 22 is formed of silicon and the glass chip 23 and the insulating member 29 are formed of Pyrex (the registered trademark) glass, since the thermal expansion coefficient of silicon is $2.3 \times 10^{-6}/°$ C. whilst the thermal expansion coefficient of Pyrex (the registered trademark) glass is $3.2 \times 10^{-6}/°$ C. and they are approximate each other, a distortion due to a thermal stress at these bonded portions is reduced, the flow sensor 12 can be prevented from being broken, an output from the flow sensor 12 hardly drifts, and a detection accuracy of the flow sensor 12 is stabilized.

Furthermore, the sensor chip 22 has a thickness of 0.2 to 1.0 mm, a size of approximately 1.5 mm×3.5 mm to 6.0 mm×12.0 mm, and a thermal conductivity of approximately 150 W/m·k; and the insulating member 29 has a thickness of 0.5 to 1.0 mm, a size of approximately of 1.5 mm×3.5 mm to 6.0 mm×12.0 mm, and a thermal conductivity of approximately 1 W/m·k. As a result, the insulating member 29 has a low thermal conductivity or, in other words, the insulating member 29 has high thermal insulation, and hence there is an effect of suppressing an influence of heat transmitted through the metal (stainless steel) attachment plate 13 by the insulating member 29 and uniforming and stabilizing a temperature of the sensor chip 22.

Figure 5:
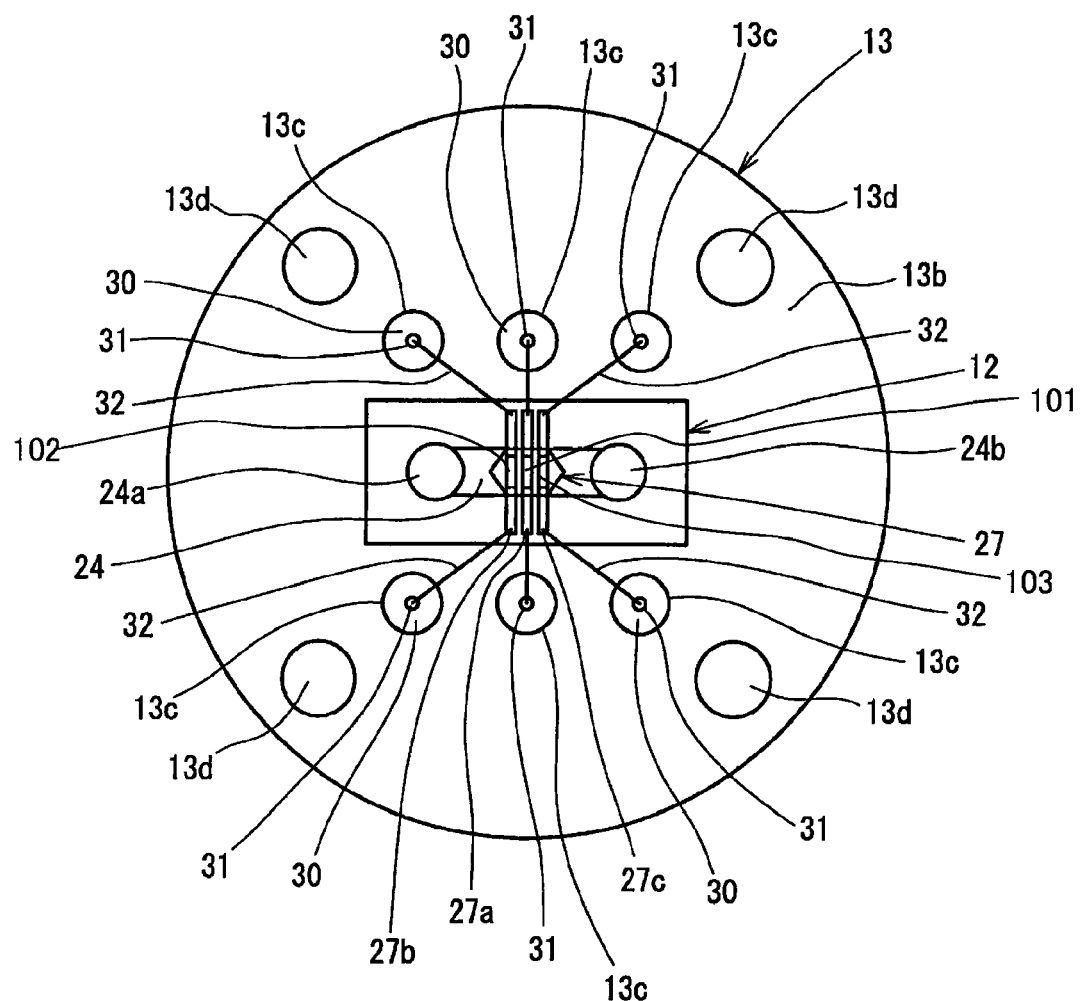
FIG. 5 is a bottom view of an attachment plate depicted in FIG. 2.

As shown in FIGS. 2 and 5, the attachment plate 13 has a discoid shape, and the flow sensor 12 is fixed at the center of a lower surface (an inner surface) 13b of this plate. That is, a lower surface 29b of the insulating member 29 bonded to the lower surface 22b of the sensor chip 22 depicted in FIGS. 3 and 4 is bonded to and held by the lower surface (the inner surface) 13b of the attachment plate 13 through, e.g., an epoxy-based adhesive. Bolt holes 13d are provided at a plurality of positions (e.g., four positions) on the same circumference at a rim portion of the attachment plate 13 along a circumferential direction at equal intervals. This attachment plate 13 is formed of a stainless member.

Holes 13c are formed at position near both sides of the flow sensor 12 on the attachment plate 13 to reach the lower surface 13b from an upper surface 13a in association with the lead patterns 27a, 27b, and 27c. Connection terminals 31 are supported in these holes 13c to pierce the central portion of an insulating member 30 from the upper surface 13a side to the lower surface 13b side through the insulating member 30. It is to be noted that the insulating member 30 has electrical insulation. Therefore, the connection terminals 31 are electrically insulated from and disposed to the attachment plate 13 formed of stainless. Furthermore, the lead patterns 27a, 27b, and 27c of the flow sensor 12 are connected with distal ends of the respective corresponding connection terminals 31 through lead wires 32.

Here, an electrostatic capacitance C between surfaces of the sensor chip 22 of the flow sensor 12 and the attachment plate 13 on the bonded side (C=∈S/D [F], S is an area of the lower surface 22b of the sensor chip 22 and the insulating member 29) is reduced as a distance d between these surfaces is increased, and it is in proportion to a dielectric constant c of a substance interposed between these members.

Figure 7:
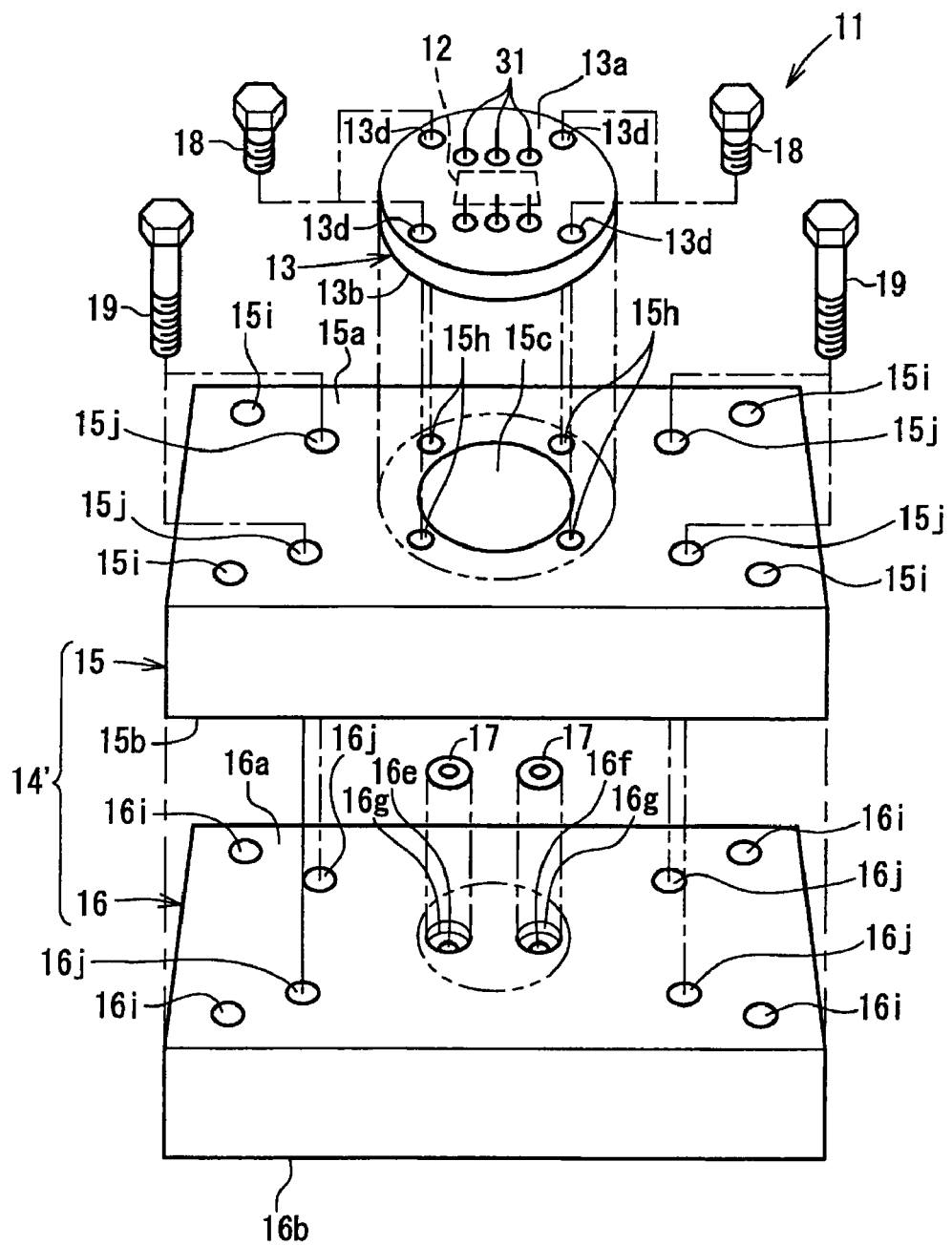
FIG. 7 is an assembling perspective view showing a modification of the flow sensor unit depicted in FIG. 2.

When the insulating member 29 is sandwiched between the sensor chip 22 and the attachment plate 13 like the present invention, the distance d between the surfaces of the sensor chip 22 and the attachment plate 13 on the bonded side is increased by an amount corresponding to a thickness (0.5 to 1.0 mm) of the insulating member 29, and hence the electrostatic capacitance C becomes small as compared with a flow sensor unit 10 in FIG. 7 concerning the present invention in which a sensor chip 4 is directly bonded to an attachment plate 6 through an adhesive.

Moreover, as explained above, Pyrex (the registered trademark) glass has the relative dielectric constant of 4.6 to 4.8, and a relative dielectric constant as a total obtained by adding this value to a relative dielectric constant of the adhesive which is another substance interposed between the sensor chip 22 and the attachment plate 13 is higher. In accordance with this value, a parasitic capacitance between the sensor chip 22 and the attachment plate 13 becomes lower.

As a result, since the parasitic capacitance formed between the sensor chip 22 and the attachment plate 13 becomes approximately ⅛ of that of the flow sensor unit 10 concerning the present invention, the sensor chip 22 hardly comes under the influence of, e.g., noise, thereby avoiding degradation in output characteristics of the flow sensor 12.

Additionally, although a parasitic capacitance when the insulating member 29 is not present between the attachment plate 13 and the sensor chip 22 and these members are bonded by using an epoxy resin (a thickness of approximately 40 μm) is 30 to 60 pF, the parasitic capacitance can be reduced to 4 to 8 pF when the insulating member 29 having a thickness of 1 mm is interposed. Further, interposing the insulating member 29 having the thickness of 1 mm in this manner enables increasing a breakdown voltage to approximately 1000 V.

It is to be noted that, as the insulating member 29, ceramics can be considered in addition to glass. However, when a sensor chip formed of a silicon material is used, an insulating member whose thermal expansion coefficient is close to that of silicon is preferable, and adopting borosilicate glass as a material of this insulating member like this embodiment is desirable.

Using materials having thermal expansion coefficients close to each other for the sensor chip 22 and the insulating material 29 is preferable because a distortion due to, e.g., a change in a temperature around the sensor chip 22 and the insulating member 28 is hardly produced in both the sensor chip 22 and the insulating member 29 when the thermal expansion coefficients are close to each other, and hence an output from the flow sensor 12 rarely drifts, thus avoiding degradation in a detection accuracy.

Therefore, an insulating member whose thermal expansion coefficient is close to that of the sensor chip 22 may be applied in accordance with a material of the sensor chip 22 without departing from the scope of the present invention.

Figure 6:
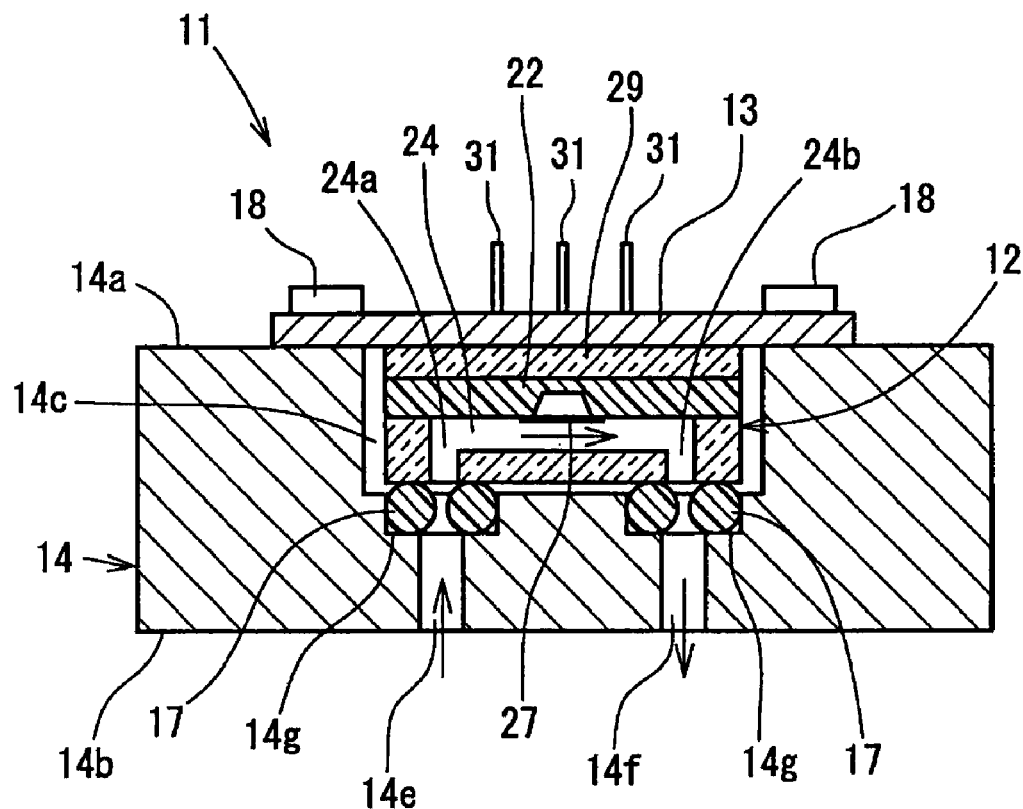
FIG. 6 is a cross-sectional view in a state where the flow sensor unit depicted in FIG. 2 is assembled.

Again referring to FIG. 2, the flow path body 14 has a board body having a cuboid shape larger than the attachment plate 13, and the hole 14c as an accommodating portion for accommodating the flow sensor 12 therein is formed at a substantially central part of an upper surface 14a thereof. This hole 14c has a size that allows an internal diameter to be placed on a slightly inner side apart from the bolt holes 13d of the attachment plate 13 indicated by a chain double-dashed line, and the flow sensor 12 can be accommodated in this hole in such a manner that an outer peripheral portion thereof is slightly apart from an inner peripheral surface of this hole with a predetermined gap therebetween. Furthermore, a depth of the hole 14c is formed to be slightly deeper than a sum of a height (a thickness) of the flow sensor 12 and a board thickness of the insulating member 29 as shown in FIG. 6.

On a bottom surface 14d of the hole 14c, a fluid lead-in path 14e and a fluid lead-out path 14f are formed at positions associated with the fluid lead-in path 24a and the fluid lead-out path 24b of the glass chip 23 of the flow sensor 12 so as to reach a lower surface 14b. Moreover, holes 14g which accommodate the O rings 17 are concentrically counter-bored with a predetermined depth at opening portions of these fluid lead-in path 14e and fluid lead-out path 14f on the bottom surface 14d side. Screw holes 14h are formed on the outer side of the hole 14c in the upper surface 14a of the flow path body 14 in association with the bolt holes 13d of the attachment plate 13. Additionally, bolt holes 14i reaching the lower surface 14b are formed at four corners of the upper surface 14a so that the flow path body 14 can be fixed to, e.g., a semiconductor manufacturing apparatus which is not shown here. It is to be noted that the flow path body 14 is formed of a stainless member.

Assembling of the flow sensor unit 11 will now be explained. The O rings 17 are accommodated in the respective holes 14g of the opening portions of the fluid lead-in path 14e and the fluid lead-out path 14f on the bottom surface 14d side which are formed in the bottom surface 14d of the fluid path body 14 as shown in FIGS. 2 and 6.

Then, the attachment plate 13 is mounted on the upper surface 14a of the flow path body 14, the flow sensor 12 is accommodated in the hole 14c, and the bolts 18 are inserted into the bolt holes 13d and screwed and fixed in the screw holes 14h. Rim portions of the fluid lead-in path 24a and the fluid lead-out path 24b in the glass chip 23 of the flow sensor 12 respectively compress the O rings 17 when the bolts 18 are fastened, and the fluid lead-in path 24a and the fluid lead-out path 24b of the glass chip 23 are air-tightly connected with the fluid lead-in opening 14e and the fluid lead-out opening 14f to achieve communication therebetween. In this manner, the flow sensor unit 11 is assembled.

The thus assembled flow sensor unit 11 is disposed to a non-illustrated semiconductor manufacturing apparatus and fixed by inserting non-illustrated bolts into the bolt holes 14i. Further, the fluid lead-in opening 14e and the fluid lead-out opening 14f of the fluid body 14 are air-tightly connected with measurement target fluid paths of the semiconductor manufacturing apparatus to achieve communication therebetween, and a measurement target fluid flows as indicated by arrows in FIG. 6. Furthermore, the respective connection terminals 31 of the flow sensor 12 are connected with a non-illustrated measurement target.

The measurement target fluid is led into the flow path 24 from the fluid lead-in opening 24a of the fluid path 24 and led out from the fluid lead-out opening 24b. Here, when the heater 101 of the flow rate detecting section 27 is energized, the heater 101 is heated to a temperature that is higher than a temperature of a gas measured by an ambient temperature sensor provided on the silicon substrate 25 by a given predetermined temperature by the control circuit, thereby heating the gas flowing through the flow path 24.

When the gas does not flow, uniform temperature distributions are formed on the upstream side/downstream side of the heater 101, and the temperature measuring element 102 on the upstream side and the temperature measuring element 103 on the downstream side indicate resistance values corresponding to substantially equal temperatures. On the other hand, when the gas flows, the uniform temperature distributions on the upstream side/downstream side of the heater 101 collapse, and a temperature on the upstream side is lowered whilst a temperature of the downstream side is increased. Further, a difference between resistance values of the temperature measuring elements, i.e., a temperature different equivalently associated with this difference is detected by, e.g., a Wheatstone bridge circuit constituted of the temperature measuring element 102 on the upstream side and the temperature measuring element 103 on the downstream side to measure a flow rate of the gas flowing through the flow path 24.

As shown in FIG. 6, a space is formed between an inner peripheral surface of the hole 14c as a flow sensor accommodating portion of the metal flow path body 14 and an outer peripheral surface of the flow sensor 12, and this space is filled with air. Therefore, the inner peripheral surface is not in contact with the outer peripheral surface, and hence the sensor chip 22 is hardly affected by heat transmitted to the flow path body 14. As a result, a temperature of the sensor chip 22 is uniformed and stabilized, thereby avoiding degradation in a detection accuracy of the sensor chip 22.

It is to be noted that a vacuum may be formed in the space between the inner peripheral surface of the hole 14c as the flow sensor accommodating portion of the flow path body 14 and the outer peripheral position of the flow sensor 12, or this space may be filled with a material having heat insulation and electrical insulation. Even if this structure is adopted, the sensor chip 22 is hardly affected by heat transmitted to the flow path body 14.

It is to be noted that the example where an indirectly-heated type flow rate detecting section is constituted of one heater (the heat generating element) and the two temperature measuring elements arranged on both sides of this heater has been explained in this embodiment, but the present invention is not restricted thereto, and one heat generating element, i.e., one heater may be used to constitute a self-heating type flow rate detecting section, or two heat generating elements, i.e., two heaters may be used to constitute the self-heating type flow rate detecting section.

Further, although integrally forming the flow path body 14 is basically preferable as explained above, the flow path body 14 may be divided into upper and lower portions by using the bottom surface 14d of the hole 14c accommodating the flow sensor 12 as a boundary so that the flow path body 14 is formed of an upper flow path body and a lower flow path body.

FIG. 7 is an assembling perspective view showing a flow sensor unit which is of a type where flow path body is divided into two portions as a modification of the flow sensor unit 11 depicted in FIG. 2. It is to be noted that, in FIG. 7, like reference numerals denote portions associated with those in FIG. 2, thereby omitting a detailed explanation thereof. A flow path body 14' is formed of an upper flow path body 15 and a lower flow path body 16. In the upper flow path body 15, a hole 15c accommodating a flow sensor 12 is formed to reach a lower surface 15b from an upper surface 15a, and screw holes 15h are formed on an outer side of the hole 15c of the upper surface 15a in association with bolt holes 13d of an attachment plate 13. Furthermore, bolt holes 15i and 15j reaching the lower surface 15b are formed at four corners of the upper surface 15a.

A fluid lead-in path 16e and a fluid lead-out path 16f are formed in the lower flow path body 16 in association with a fluid lead-in path 24a and a fluid lead-out path 24b of the flow sensor 12, and holes 16g accommodating O rings 17 are concentrically formed in opening portions on the upper surface 16a side. Moreover, bolt holes 16i and screw holes 16j are formed at four corners of the upper surface 16a in association with the bolt holes 15i and 15j of the upper flow path body 15.

Additionally, the upper flow path body 15 is mounted on the upper surface 16a of the lower flow path body 16 to inert bolts 19 into the bolt holes 15j, and the bolts 19 are screwed and fixed in the screw holes 16j. As a result, the flow path body 14' is formed. Further, the flow sensor 12 is assembled to this flow path body 14' like the example of the flow path body 14.

Furthermore, a wall (an inner peripheral surface of the hole 14c) of the accommodating portion of the flow path body 14 does not have to surround the entire surface of the outer peripheral portion of the flow sensor 12, and it may surround bolt portions (bolts 18) alone.

As explained above, according to the present invention, since the insulating member having high heat insulation and electrical insulation is interposed between the metal attachment plate and the sensor chip of the flow sensor and bonded to these two members, the sensor chip is hardly affected by heat transmitted through the metal attachment plate, and a temperature of the sensor chip can be uniformed and stabilized, thereby avoiding degradation in a detection accuracy of the flow sensor.

Moreover, a parasitic capacitance between the metal attachment plate and the sensor chip can be reduced, and the sensor chip hardly comes under the influence of, e.g., noise, thus avoiding degradation in output characteristics of the flow sensor. Additionally, the parasitic capacitance between the metal sensor chip attachment plate and the sensor chip can be reduced, and a voltage exceeding a breakdown voltage of the sensor chip can be prevented from being applied to the sensor chip.

Additionally, since the space is formed between the metal flow path body and the flow sensor and these members are not in contact with each other, the sensor chip is hardly affected by heat transmitted through the metal flow path body, and uniforming and stabilizing a temperature of the sensor chip enables avoiding degradation in an accuracy.

Further, since the sensor chip formed of a silicon material is used, applying borosilicate glass having a thermal expansion coefficient close to that of silicon as the insulating member makes it difficult to form a distortion of the sensor chip and the insulating material due to, e.g., a change in a temperature around the sensor chip and the insulating member or a pressure of a measurement target fluid, and hence an output from the flow sensor hardly drifts, thus avoiding degradation in a detection accuracy of the flow sensor.

What is claimed is:

1. A flow sensor unit which detects a flow rate of a measurement target fluid, comprising:
   a flow sensor having: a sensor chip in which a flow rate detecting section is formed on an electric insulating film applied to cover at least a part of a concave portion formed on an upper surface of a substrate; and a flow path forming member which is provided on the sensor chip and has a flow path of the fluid flowing through the flow rate detecting section formed therein;
   a metal flow path body which accommodates the flow sensor and has an accommodating portion accommodating the flow sensor in a state where an inner peripheral surface of the flow path body is separated from an outer peripheral portion of the flow sensor formed therein;
   a metal attachment plate which is fixed to the flow path body so as to accommodate the flow sensor in a state where the flow sensor is fixed and held in the accommodating portion of the flow path body; and
   an insulating member which is interposed between the sensor chip of the flow sensor and the attachment plate, bonded to the sensor chip, and also bonded to the attachment plate.

2. The flow sensor unit according to claim 1, wherein the sensor chip is formed of a silicon member, the flow path body and the attachment plate are formed of a stainless member, and the insulating member is formed of borosilicate glass.

3. The flow sensor unit according to claim 1, wherein a concave portion is formed at a central position of an upper surface of the flow sensor chip below the flow rate detecting section, a region of the electric insulating film that covers the concave portion where the flow rate detecting section is formed serves as a diaphragm to thermally insulate the flow rate detecting section from the sensor chip therearound, and the flow rate detecting section serves as a thermal flow rate detecting section and is constituted of a heater as a heat generating element and temperature measuring elements as resistance elements arranged on an upstream side and a downstream side of the heater at equal intervals on the electric insulating film.

4. The flow sensor unit according to claim 1, wherein a space between an inner peripheral surface of the flow sensor accommodating portion of the flow path body and an outer peripheral portion of the flow sensor is a vacuum, or filled with air, or filled with a member having heat insulation and electrical insulation.

5. A flow sensor unit which detects a flow rate of a measurement target fluid, comprising:
   a flow sensor having: a sensor chip in which a flow rate detecting section is formed on an electric insulating film applied to cover at least a part of a concave portion formed on an upper surface of a substrate; and a flow path forming member which is provided on the sensor chip and has a flow path of the fluid flowing through the flow rate detecting section formed therein;
   a metal flow path body which accommodates the flow sensor and has an accommodating portion accommodating the flow sensor in a state where an inner peripheral surface of the flow path body is separated from an outer peripheral portion of the flow sensor formed therein;
   a metal attachment plate which is fixed to the flow path body so as to accommodate the flow sensor in a state where the flow sensor is fixed and held in the accommodating portion of the flow path body; and
   an insulating member which is interposed between the sensor chip of the flow sensor and the attachment plate, bonded to the sensor chip, and also bonded to the attachment plate;
   wherein the sensor chip is formed of a silicon member, the flow path body and the attachment plate are formed of a stainless member, and the insulating member is formed of borosilicate glass.

* * * * *